United States Patent [19]

Ponziani

[11] Patent Number: 4,480,514
[45] Date of Patent: Nov. 6, 1984

[54] DRIVING TOOL FOR TAMPER RESISTANT SCREW

[75] Inventor: Louis Fiore Ponziani, Kettering, Ohio

[73] Assignee: Cooper Industries, Inc., Houston, Tex.

[21] Appl. No.: 389,264

[22] Filed: Jun. 17, 1982

[51] Int. Cl.$^3$ .............................................. B25B 23/00
[52] U.S. Cl. ........................................ 81/461; 81/90 C
[58] Field of Search ................ 81/461, 460, 441, 436, 81/90 C, 121 A, 121 R, 119

[56] References Cited

U.S. PATENT DOCUMENTS

| | | | |
|---|---|---|---|
| 1,281,438 | 10/1918 | Tuttle | 81/121 A |
| 2,180,633 | 11/1939 | Holt | 81/461 |
| 2,459,610 | 1/1949 | Zadina | 81/90 C |
| 2,550,775 | 5/1951 | Clark | 81/436 |
| 2,770,991 | 11/1956 | Myers | 81/90 C |
| 3,930,428 | 1/1976 | Hale | 81/121 R |
| 4,356,839 | 11/1982 | Voipovich | 81/90 C |

FOREIGN PATENT DOCUMENTS 966676 3/1950 France ................................. 81/461

Primary Examiner—James L. Jones, Jr.
Attorney, Agent, or Firm—Fraser, Barker, Purdue & Clemens

[57] ABSTRACT

A driving tool for installing and removing tamper resistant screws having conical heads provided with three equiangularly, circumferentially spaced slots extending longitudinally along the conical head. The tool includes a bit end defined by three tangs separated by a central conical recess for receiving the conical head of the screw. The side walls of the tangs adjacent the bottom end are flat, parallel sections tapering away from the bottom end toward the roots of the tangs for providing effectively large bearing surfaces.

5 Claims, 8 Drawing Figures

DRIVING TOOL FOR TAMPER RESISTANT SCREW

BACKGROUND OF THE INVENTION

This invention generally relates to tools for driving tamper resistant screws and, more particularly, to tools having a bit end readily engageable with slots provided in the peripheral surface of the heads of the tamper resistant screws.

Many types of tamper resistant screws and complementary tools for installing and removing such screws have been disclosed in the past. Screws in this category normally include some type of slotted or recessed heads. The heads of the screws usually have some variation of a cruciform or similar shape adapted to be engaged by a complementary shaped bit end of a driving tool. In such arrangements, when torque is applied to the heads of such screws, the radial outer portion of the slots or recesses and the tips of the driving tool are caused to accept a major portion of the torque force, thus producing high unit loading. A continuing problem, in such arrangements, has been the lack of ability to apply torque to such screws without destroying the heads of the screws or the driving bit of the tools.

Heretofore, the ability of driving tools to withstand torque forces has been limited and often times, fatigue failure of driving tools is encountered upon repeat use. Another problem is that in many applications the driving tool is easily cammed out of the slots or recesses during a torquing operation, even when very high axial loads are applied to the driving tool in an attempt to hold the driving tip of the tool in place.

SUMMARY OF THE INVENTION

The present invention provides a novel driving tool for installing and removing tamper resistant screws. The driving tool, constructed in accordance with the invention, is an elongated cylindrical member having a bit end including three radially disposed, circumferentially spaced driving and removal tangs; the faces of each tang being adapted to exert equal driving and removal force to corresponding faces of recessed slots produced in the peripheral surface of the heads of the tamper resistant screws. Preferably, the diameter of the bit end of the driving tool is no larger than the diameter of the fastener head for allowing the fastener head to be driven into a similarly sized counterbore.

The bottom surface of the bit end of the tool is provided with an inverted conical recess for receiving a similarly shaped head of the tamper resistant screw. Three arcuate equiangularly spaced cut-out portions define the three driving tangs; the opposed side faces of which, adjacent the bottom end of the tangs, are formed with planar parallel surfaces for engaging the side walls of the slots formed in the head of the screws. Further, the opposed side faces of the tangs include angularly shaped sections thus producing a bearing surface which allows higher torque forces to be applied before distortion of the screw heads and/or the tangs can occur.

An object of the present invention is to produce a driving tool for installing and removing tamper resistant screws which is simple in construction and design and, thus inexpensive to manufacture.

BRIEF DESCRIPTION OF THE DRAWINGS

The above, as well as other objects of the invention, will become readily apparent to one skilled in the art from reading the following detailed description of the preferred embodiment of the invention when considered in the light of the accompanying drawings in which.

DETAILED DESCRIPTION OF THE PREFERRED EMBODIMENTS

Figures 1, 2, 3:
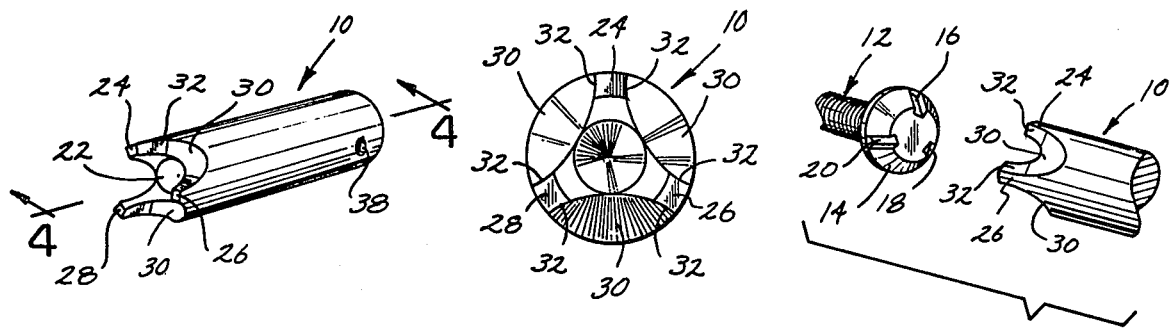
FIG. 1 is a perspective view of a driving tool constructed in accordance with the invention for installing and removing tamper resistant screws.
FIG. 2 is an enlarged plan view of the bit end of the driving tool illustrated in FIG. 1.
FIG. 3 is a fragmentary exploded perspective view of the bit end of the driving tool illustrated in FIG. 1 and the head end of a portion of a tamper resistant screw adapted to be driven thereby.

Referring to the drawings where like reference numerals designate similar parts throughout, there is illustrated a driving tool 10 for installing and removing tamper resistant screws.

The driving tool 10 of this invention is constructed to drive a tamper resistant screw 12 such as illustrated in FIG. 3. The screw 12 include a conical head 14 in the form of a frustum of a cone having three recessed, longitudinally extending slots 16, 18 and 20 which are equiangularly disposed in the conical surface of the head 14 so that corresponding parts thereof, such as the radial center lines, are separated by angles of 120°.

The driving tool 10 is preferably a cylindrical member and is shaped at its bit end to cooperate with the slots in the head 14 of the screw 12 in such a manner that the desired advantageous features of the invention are achieved.

Also, the diameter of the driving tool 10 is no larger than the base diameter of the conical head 14 of the screw 12 for allowing the head 14 to be driven into and removed from a similarly sized counterbore; thus providing improved resistance to tampering.

Figure 5:
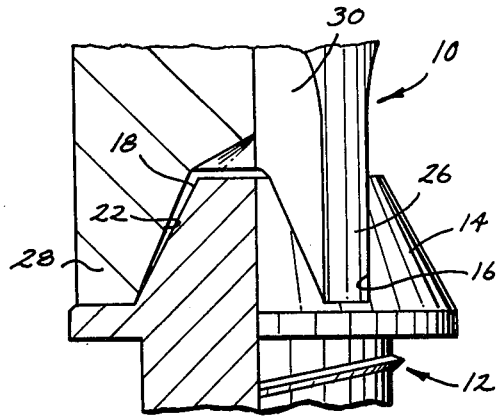
FIG. 5 is an enlarged fragmentary half-sectional view of the driving tool engaged with the head of the tamper resistant screw illustrated in FIG. 3.

The bit end of the tool 10 is generally shaped to closely fit and substantially, but not completely, enclose the head 14 of the screw 12. To this end, the bottom surface of the bit end is provided with a conical recess 22 somewhat similar in size to a cone defined by the bottom surfaces of the slot 16, 18 and 20 provided in the conical head 14 of the screw 12 (See FIG. 5). It should be noted that the base diameter of the conical recess is substantially equal to the base diameter of the cone defined by the slots in the head 14 of the screw, the purpose of which will be described hereinafter.

Further, the bit end of the tool 10 is provided with three driving tangs 24, 26 and 28, corresponding parts of which, such as the radial center lines, are equiangularly spaced about the axis of the tool and thus separated by angles of 120°. The tangs 24, 26 and 28 are defined by three inwardly curved, circumferentially spaced cut-out portions 30 to produce driving faces 32 on each side wall of the tangs 24, 26 and 28. The driving face 32 of each tang is planar and formed parallel to the opposed face so as to extend between the facing side walls of the three slots 16, 18 and 20 in the head 14.

The tangs 24, 26 and 28 of the tool 10 are adapted to engage the slots 16, 18 and 20 of the screw head 14, at their bottom ends and also at an angle away from the bottom ends toward the roots of the tang which gives an effectively large bearing surface of the contacting driving faces 32 in either direction of rotation thus allowing a high torque to be applied. In this embodiment of the invention, the tangs 24, 26 and 28 are readily visible to an operator for easy engagement into the slots in the screw head 14.

Figure 6:
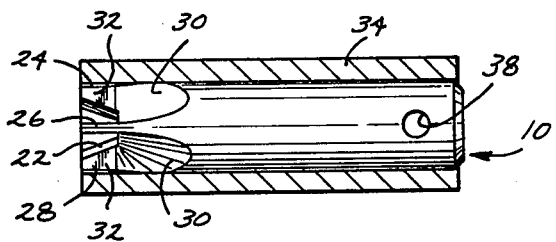
FIGS. 6, 7 and 8 are partial sectional views similar to FIG. 4 illustrating other embodiments of a driving tool.
Figure 7:
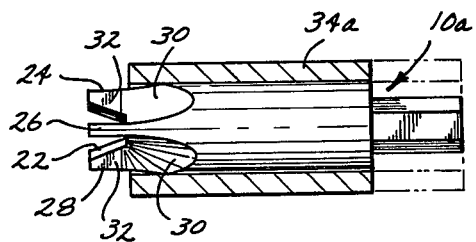
Figure 8:
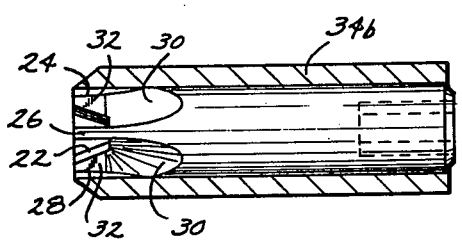

Referring now to FIG. 6, the driving tool 10 may be inserted within a sleeve 34 and metallurgically bonded thereto for strengthening the tangs 24, 26 and 28 to withstand large torques. In the embodiment of the invention illustrated in FIG. 7, a sleeve 34a partially surrounds the body of a tool 10a adjacent the cut-out portions 30. For strengthening the root of the tangs as well as providing visibility to an operator, the end of a sleeve 34b may be tapered for special applications as illustrated in FIG. 8.

Figure 4:
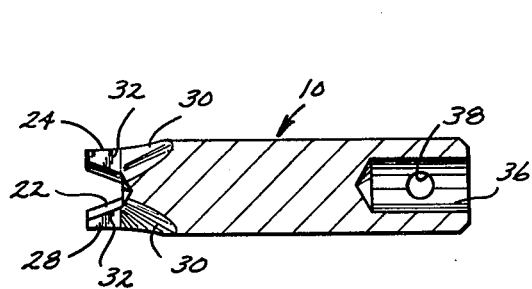
FIG. 4 is an enlarged cross-sectional view taken substantially along line 4—4 of FIG. 1.

Referring now to FIGS. 1, 4 and 6, the driven end of the driving tool 10 may be formed with a bore 36 (FIG. 4) having cross holes 38 for accepting a shaft and cross pin (not shown) of a driver (not shown). The driven end of a tool 10a or 10b may be formed with a male (See FIG. 7) or female (FIG. 8) configuration of hexagonal, square or other shapes as indicated in the figures so that the tamper resistant driving tools can be driven with ordinary types of hand or power operated devices.

It will be appreciated from the foregoing description that the illustrated and described driving tools for installing and removing tamper resistant screws are of strong construction and can impart large torques without deformation.

In accordance with the provisions of the patent statutes, the principle and mode of operation of the invention has been explained and what is considered to represent its preferred embodiments have been illustrated and described. It should, however, be understood that the invention may be practiced otherwise than as specifically illustrated and described without departing from the spirit and scope.

What is claimed:

1. A tool for driving a tamper resistant screw having a conical head provided with three equiangularly spaced slots extending longitudinally along the surface of the conical head, comprising:
    (a) a body having a bit end and defining a longitudinal axis,
    (b) said bit end including three equiangularly spaced tangs separated from each other by a central recess, the recess thereof adapted to receive the conical head of the tamper resistant screw;
    (c) each said tangs having substantially planar, parallel side walls engageable with the side walls of the slots of the screw, pairs of substantially planar, parallel side walls on adjacent said tangs defining portions of an inwardly curved surface;
    (d) each said tangs having a generally inwardly facing surface defining a portion of a frustum of a cone, said surfaces disposed at a smaller acute angle to said axis and merging into a generally conical surface disposed at a larger acute angle to said axis, and
    (e) said bit end having a diameter no larger than the base diameter of the conical end of the tamper resistant screw whereby said tangs are visible for engagement with the slots in the head of the tamper resistant screw allowing the head to be installed within a similarly sized counterbore.

2. The invention defined in claim 1 including a sleeve encasing said body adjacent said bit end.

3. The invention defined in claim 1 wherein the side walls of each said tangs taper away from the end toward the roots of said tangs for providing effectively large bearing surfaces between the contacting faces of said tangs and adjacent side walls of the slots in the head of the tamper resistant screws.

4. The invention defined in claim 1 wherein said curved surface is convex and extends smoothly between said adjacent said tangs.

5. The invention of claim 4 wherein said convex, curved surface has a radius equal to or greater than the radius of said bit end.

* * * * *